May 11, 1965     J. H. CULLING     3,182,654
SOLAR ENERGY HEATING APPARATUS
Filed Aug. 25, 1960
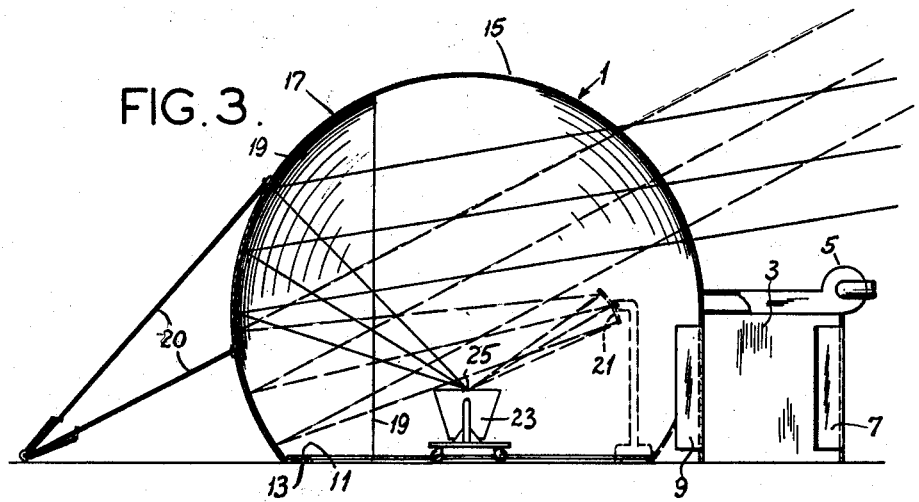
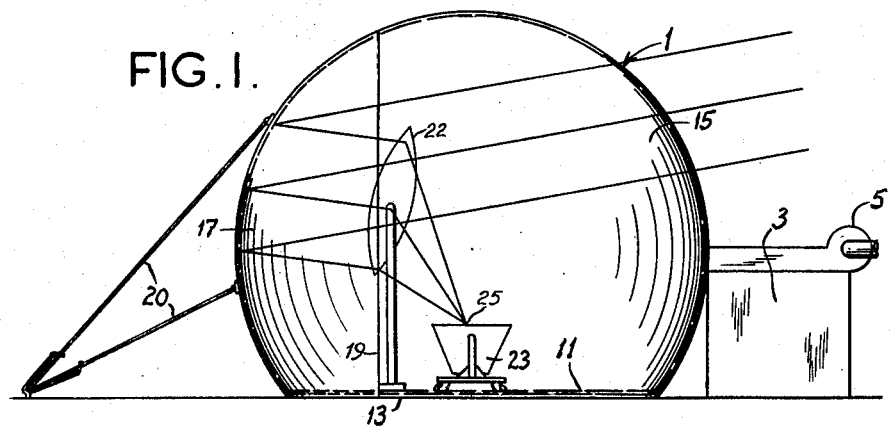
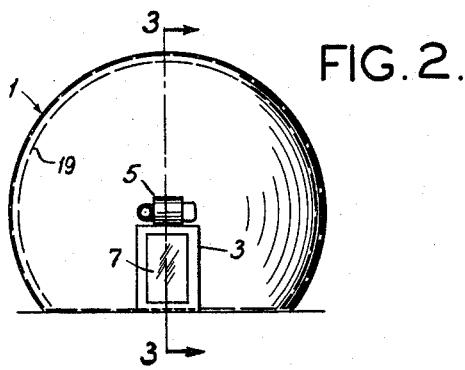

3,182,654
SOLAR ENERGY HEATING APPARATUS
John H. Culling, Kirkwood, Mo., assignor to Carondelet Foundry Company, St. Louis, Mo., a corporation of Missouri
Filed Aug. 25, 1960, Ser. No. 51,846
6 Claims. (Cl. 126—270)

This invention relates to solar energy heating apparatus, and more particularly to a solar energy heating apparatus for concentrating solar energy on a very small area for such useful purposes as melting, baking, storing of heat, or any other purpose in which a high temperature is required.

Heretofore, solar energy heating apparatus, and particularly solar energy heating apparatus or furnaces suitable for concentrating solar energy rays on a very small area, were relatively expensive to construct due to the high cost of a reflector adapted to concentrate solar energy, such as a parabolic mirror or a polished metal reflector, and the rigid supporting structure for these reflectors. These solar energy heating apparatus or furnaces were, by the nature of their construction and use, exposed to rain, dust, snow, and other elements detrimental to their operation. Being of a rigid construction, these solar furnaces were not adapted for use in areas where earthquakes, windstorms, or other hazardous conditions might develop.

Accordingly, among the several objects of this invention may be noted the provision of a solar energy heating apparatus having a pneumatic structure protecting the reflecting surface or surfaces from damaging weather elements and at the same time providing a shelter for accessory equipment and operating personnel; the provision of a solar energy heating apparatus having its own housing structure in a form suitable for quick deflation and transportation; the provision of a solar energy heating apparatus having an inflatable housing, one portion of which is adapted to transmit solar energy and a second portion of which is adapted to reflect and concentrate solar energy transmitted through the first portion toward an interior region of the housing; and the provision of a solar energy heating apparatus which is of a simplified and economical construction and reliable in operation. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a side view in elevation of a solar energy heating apparatus of this invention;

FIG. 2 is a front view of FIG. 1; and

FIG. 3 is a vertical section taken on line 3—3 of FIG. 2, showing two methods of use of the solar energy heating apparatus.

Corresponding reference characters indicate corresponding parts throughout the several views of the drawings.

Referring to the drawings, a solar energy heating apparatus of the present invention is shown to comprise a housing 1 having an entrance 3. The housing 1 is a relatively air-tight flexible dome-like or tent-like structure fabricated, for example, from any customary synethetic resin plastic material. The flexible dome-like or tent-like configuration is maintained by having the internal air pressure slightly in excess of the surrounding or atmospheric pressure. An internal pressure of a few ounces above atmospheric pressure is sufficient to prevent collapse or substantial deformation of the pneumatic housing. The internal pressure may be maintained by an air blower 5 adapted to maintain the desired internal pressure even in the presence of seam leaks, small ventilation ports, windows, or doors. The air blower 5 is mounted on entrance 3. A pneumatic structure of this type is well known, particularly as used for housing radar and other defense equipment in arctic or subarctic areas.

The entrance 3 has an outer door 7 and an inner door 9, both of which open inwardly. By the use of these doors 7 and 9, an air lock is formed within entrance 3 to provide for the entrance and exit of operating personnel and for the transportation of materials or equipment in and out of the housing without substantial deflation thereof. Any convenient anchoring means may be used to secure the housing to the ground. For example, a rigid ring 11 made of a heavy material, such as steel, may rest on the bottom portion 13 of housing 1.

A portion of the housing is indicated at reference numeral 15. Portion 15 is substantially transparent and is adapted to transmit solar energy rays. Another portion of the housing is indicated at reference numeral 17 and is provided on the internal surface thereof with a material 19 adapted to reflect solar energy. Such material 19 may be a coating of metallic or other reflecting fabric, cloth, paint, or any other material adapted to reflect solar energy. The portion 17 of the housing and the reflective material 19 on the internal side thereof may be of a paraboloidal, spherical, or ellipsoidal shape, or of some other suitable shape that concentrates radiant energy. The desired shape of portion 17 and reflective material 19 may be obtained by molding them to such shape or by the use of guy wires (such as indicated at 20) attached to the outside of portion 17 and anchored to the ground.

Solar energy rays pass through portion 15 and strike the reflector 19. These rays may then be directed and concentrated toward a small area 25, at which a focus of the solar energy rays is formed, as shown by the solid lines in FIG. 3; or they may be directed and concentrated toward a planar or corrective reflector 21 which further directs and concentrates the solar energy rays to a focus (shown in FIG. 3 to be at area 25), as shown by dotted lines in FIG. 3; or they may be directed and concentrated on area 25 by a lens 22 after reflection from reflector 19 as shown by the solid ray lines in FIG. 1.

The object or material on which the radiant energy is to be concentrated is placed on a movable carrier 23. The focus point of the radiant energy will be constantly changing, since the angle at which the radiant energy strikes the reflector will be changing as a result of the relative movement between the earth and the sun. Accordingly, when the radiant energy is directly transmitted from the reflector 19 without the use of a secondary reflector 21 or lens 22, the carrier 23 must be moved by the operating personnel or automatically by any conventional controlled movement device to keep the radiant energy focused on the object or material, or alternately the reflective surface 19 may be altered to maintain the focus of the radiant energy on carrier 23, for example by adjusting the guy wires 20.

When the secondary reflector 21 and/or a lens 22 is used, it may be moved manually or automatically so as to direct and concentrate the solar energy rays towards a stationary point and the carrier 23 and object or material carried thereby may remain fixed at that point.

The lens 22 could be placed in the path of the rays reflected by reflector 21 or it could be placed in the path of the solar energy rays reflected by reflector 19, as shown in FIG. 1.

If it is desired to melt a metal, for example, it may be done in several ways. One way is for the operating personnel to place the metal in a cupola on carrier 23. The carrier is then placed so that the solar energy rays are initially focused on the cupola. The carrier 23 is then moved from time to time as the point of focus of the solar energy changes during the period in which the melting process occurs. Also, the metal in a cupola on the carrier 23 may be situated in any convenient fixed location within the housing 15 in such a position that solar energy rays reflected from reflector 19 either fall directly on the cupola, or fall on reflector 21 or lens 22 and are directed and concentrated therefrom toward and upon the cupola. At the focus point of the solar energy rays changes, the shape of reflector 19 is modified, for example, by changing the tension in the guy wires so as to maintain the focus of the solar energy rays on the cupola or on the reflector 21 or lens 22; or the reflector or lens may be moved so as to direct and concentrate the energy rays received from reflector 19 toward the stationary cupola.

This invention is particularly adapted for use in areas, such as mountainous or remote locations, where the construction of solar energy heating apparatus requiring rigid and complex structures would be costly, if at all possible. It is further contemplated that this solar energy heating apparatus might be used in cold climate areas for heating purposes through the employment of a heat sink body. The concentrated solar energy could be stored in a radiator body or similar device during the hours in which solar energy is abundant, and slowly released to supply heating during the hours in which solar energy is limited or absent.

In view of the above, it will be seen that the several objects of the invention are achieved and other advantageous results attained.

As various changes could be made in the above constructions without departing from the scope of the invention, it is intended that all matter contained in the above descripion or shown in the accompanying drawings shall be interpreted as illustrative and not in a limiting sense.

I claim:

1. A solar energy heating apparatus comprising an inflatable tent-like structure for housing personnel, a first portion of said structure being adapted to transmit solar energy, a second portion having a reflector integrally attached to the interior surface of said second portion, and means within said structure adapted to concentrate solar energy directed thereon toward an object within said structure, said reflector being adapted to reflect solar energy transmitted through said first portion toward said means, said means being movable to receive said solar energy from said reflector as the sun moves relative to the structure.

2. A solar energy heating apparatus as defined in claim 1 wherein said means comprises a second reflector.

3. A solar energy heating apparatus as defined in claim 1 wherein said means comprises a lens.

4. A solar energy heating apparatus comprising an inflatable tent-like structure for housing personnel, blower means for maintaining the air pressure within said structure greater than the air pressure outside said structure thereby to support the structure, a first portion of said structure being adapted to transmit solar energy, a second portion having a reflector adapted to reflect and concentrate solar energy transmitted through said first portion toward an object within said structure, and a second reflector for maintaining the solar energy focused on said object as the sun moves relative to the structure.

5. A solar energy heating apparatus comprising an inflatable tent-like structure for housing personnel, means for inflating the structure to cause the latter to assume a dome-like configuration, a first portion of said structure being adapted to transmit solar energy, a second portion of said structure being adapted to reflect and concentrate solar energy transmitted through said first portion toward an object within said structure, an air lock for entry and exit of personnel without loss of inflation, and means connected to said structure for anchoring the latter against substantial movement.

6. A solar energy heating apparatus comprising an inflatable tent-like structure for housing personnel, blower means for maintaining the air pressure within said structure greater than the air pressure outside said structure thereby to support the structure, a first portion of said structure being adapted to transmit solar energy, a second portion having a reflector adapted to reflect and concentrate solar energy transmitted through said first portion toward an object within said structure, and a lens for maintaining the solar energy focused on said object as the sun moves relative to the structure.

References Cited by the Examiner

UNITED STATES PATENTS

| | | | |
|---|---|---|---|
| 683,088 | 9/01 | Wideen | 126—270 |
| 1,302,182 | 4/19 | Lanchester | 136—1 |
| 1,880,938 | 10/32 | Emmet | 126—271 |
| 2,291,534 | 7/42 | Deppe | 126—270 X |
| 2,649,101 | 8/53 | Suits | 135—1 |
| 2,785,695 | 3/57 | Carey | 135—1 |
| 2,872,915 | 2/59 | Bowen | 126—271 |
| 3,029,596 | 4/62 | Hanold et al. | 126—270 X |
| 3,054,328 | 9/62 | Rodgers | 126—270 X |
| 3,125,091 | 3/64 | Sleeper | 126—271 |

JAMES W. WESTHAVER, *Primary Examiner.*

PERCY L. PATRICK, *Examiner.*